US012755745B2

(12) United States Patent
Maruri et al.

(10) Patent No.: US 12,755,745 B2
(45) Date of Patent: Oct. 6, 2026

(54) USER IDENTIFICATION WITH AUDIO EARBUDS

(71) Applicant: Intel Corporation, Santa Clara, CA (US)

(72) Inventors: Hector Cordourier Maruri, Guadalajara (MX); Alejandro Ibarra Von Borstel, Buda, TX (US); Julio Cesar Zamora Esquivel, West Sacramento, CA (US); Paulo Lopez Meyer, Zapopan (MX); Rodrigo Aldana Lopez, Zapopan (MX); Leobardo Campos Macias, Guadalajara (MX); Edgar Macias Garcia, Zapopan (MX); Margarita Jauregui Franco, Japopan (MX)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/932,324

(22) Filed: Oct. 30, 2024

(65) Prior Publication Data

US 2025/0061904 A1 Feb. 20, 2025

(51) Int. Cl.

| | |
|---|---|
| ***G10L 19/022*** | (2013.01) |
| ***H04R 1/26*** | (2006.01) |

(52) U.S. Cl.

CPC .............. *G10L 19/022* (2013.01); *H04R 1/26* (2013.01); *H04R 2400/01* (2013.01)

(58) Field of Classification Search

CPC ...... G10L 19/022; H04R 1/26; H04R 2400/01

See application file for complete search history.

(56) References Cited

U.S. PATENT DOCUMENTS

| | | | | |
|---|---|---|---|---|
| 9,497,530 | B1 * | 11/2016 | Campbell | H04R 1/1091 |
| 10,573,323 | B2 | 2/2020 | Huang et al. | |

* cited by examiner

*Primary Examiner* — Andrew Sniezek

(74) *Attorney, Agent, or Firm* — Akona IP PC

(57) ABSTRACT

Techniques are provided herein for identifying the user of audio earbuds. In particular, a wearer's head filters an audio signal, and the audio filtering capabilities of a user's head are used as a biometric feature. One earbud can be used as an audio emitter and the other earbud as an audio receiver. A broadband sound can be generated by the speaker in one earbud and received at the microphone of the other earbud. The received sound is filtered by the user's head and the head characterization of the received filtered sound can be used to identify the user. In particular, the material properties of the user's head change the signal, such that the received signal at the microphone of the other earbud is different from the transmitted signal. The differences are unique to the user's head due to physiological variances among people, and can be used to identify the user.

20 Claims, 8 Drawing Sheets

100

200

400

500

Spectral distance (dB)

| | Person 1 (take 1) | Person 2 (take 1) | Person 3 (take 1) | Person 4 (take 1) | Person 5 (take 1) | Person 6 (take 1) |
|---|---|---|---|---|---|---|
| Person 1 (take 2) | 6.12 | 31.35 | 29.64 | 28.99 | 28.42 | 31.25 |
| Person 2 (take 2) | 30.17 | 14.74 | 30.83 | 32.72 | 30.24 | 30.17 |
| Person 3 (take 2) | 29.34 | 30.41 | 13.08 | 31.66 | 28.89 | 32.09 |
| Person 4 (take 2) | 29.29 | 32.88 | 31.93 | 13.29 | 30.94 | 32.97 |
| Person 5 (take 2) | 28.67 | 30.15 | 29.55 | 30.92 | 9.04 | 31.31 |
| Person 6 (take 2) | 31.11 | 30.05 | 32.06 | 32.73 | 30.89 | 8.79 |

FIG. 5

USER IDENTIFICATION WITH AUDIO EARBUDS

TECHNICAL FIELD

This disclosure relates generally to user identification, and in particular to an audio-based detector for identification of a device user.

BACKGROUND

User identification is the ability of a system to correctly identify its user. Accurate user identification can help protect systems from theft and impersonation, enable personalization options, and generally enhance the user experience. However, effective and reliable user identification is a challenging problem for small devices such as headsets or wireless earbuds. In particular, many user identification applications use passwords and/or PINs which cannot be entered on small devices. Other user identification applications rely on biometric features such as fingerprints and retinal images, but these types of applications also utilize specific hardware not present in many small devices.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 5 is a table illustrating the log spectral distance comparison between two takes of recordings for six different users, in accordance with various embodiments.

DETAILED DESCRIPTION

Overview

Figure 1B:
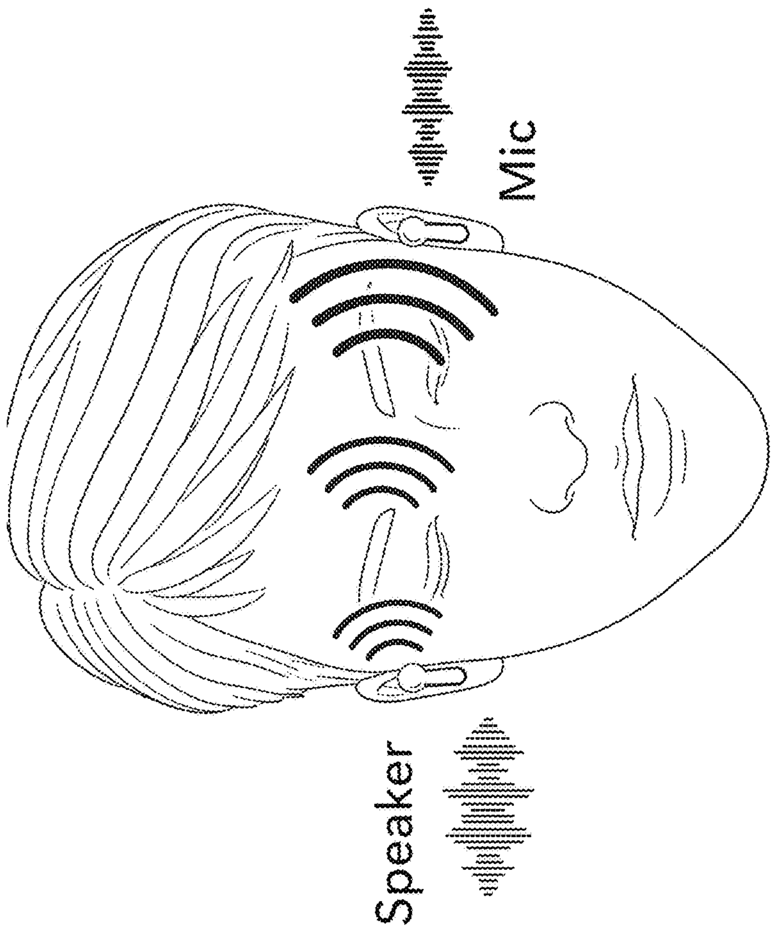
FIG. 1A-1B illustrate a user head with two earbuds, in accordance with various embodiments.

Systems and methods are provided for identifying the user of audio earbuds. In particular, a wearer's head filters an audio signal, and the audio filtering capabilities of a user's head are used as a biometric feature. One earbud can be used as an audio emitter and the other earbud as an audio receiver. Audio emitted by one earbud and captured by the audio receiver at the other earbud is filtered by the wearer's head, and the differences among users, and in particular among filtering characteristics of various user heads, can be used to identify the wearer.

According to some implementations, after a user puts on the earbuds, a broadband sound can be generated by the speaker in one earbud and received at the microphone of the other earbud. The received sound is filtered by the user's head and the head characterization of the received filtered sound can be used to identify the user. In particular, the material properties of the user's head (e.g., size, shape, rigidness, elasticity, density, etc.) changes the signal, such that the received signal at the microphone of the other earbud is different from the transmitted signal. The differences are unique to the user's head due to physiological variances among people, and can be used to identify the user. In some examples, the head characterization occurs just from one selected side (i.e., ear) to the other side, and in some examples, head characterization can occur in both directions. An identification module can analyze the characteristics of the sound as received at the microphone of the second earbud to identify the user.

For purposes of explanation, specific numbers, materials, and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the present disclosure, the phrase "A and/or B" or the phrase "A or B" means (A), (B), or (A and B). For the purposes of the present disclosure, the phrase "A, B, and/or C" or the phrase "A, B, or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicates that different instances of like objects are being referred to and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value based on the input operand of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the input operand of a particular value as described herein or as known in the art.

In addition, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or systems. Also, the term "or" refers to an inclusive "or" and not to an exclusive "or."

The systems, methods, and devices of this disclosure each have several innovative aspects, no single one of which is solely responsible for all desirable attributes disclosed herein. Details of one or more implementations of the subject matter described in this specification are set forth in the description below and the accompanying drawings.

Example User Identification Systems and Methods

Figure 1A:
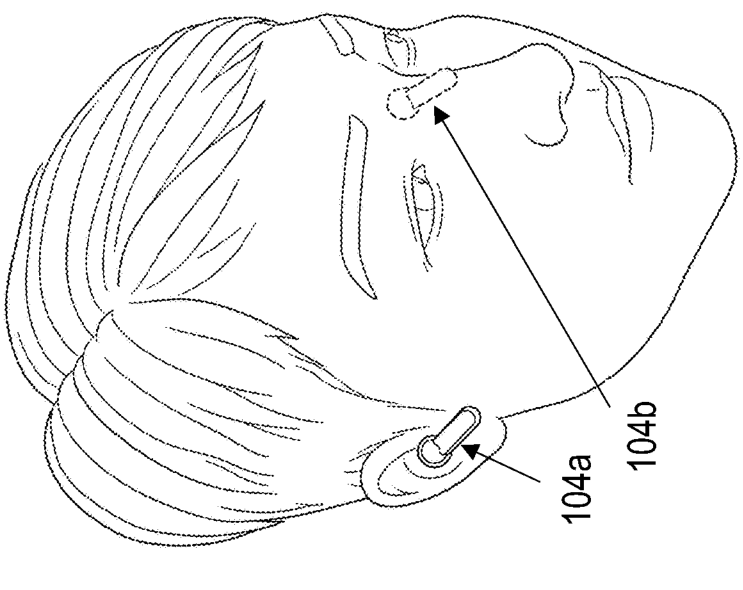

FIG. 1A shows a user head, a first wireless earbud 104*a* in the user's right ear and a second wireless earbud 104*b* in the user's left ear. The earbuds 104*a*, 104*b* can be typical and/or conventional earbuds, with both earbuds equipped to play sound and one (or both) of the earbuds having a microphone to receive sound. FIG. 1B illustrates an example in which a speaker at the first wireless earbud 104*a* plays a sound and a microphone at the second wireless earbud 104*b* receives the sound. As shown in FIG. 1B, the sound emitted from the speaker travels through the user's head before being received at the microphone. While sound may travel in other directions also, due to the nature of the first earbud 104*a* being inserted in the user's right ear, the sound emitted from the first earbud 104*a* is directed toward the user's right ear canal, and the majority of the sound received by the microphone at the second earbud 104*b* has traveled through the user's head.

Thus, the received sound at the microphone at the second earbud 104*b* is filtered by the user's head characteristics, and the received sound varies based on the user. In various embodiments, any broadband sound (e.g., white noise, a maximum length sequence (MLS), chirping) can be emitted from the speaker at the first earbud 104*a* to provide distinct head characteristics at the microphone at the second earbud 104*b*. In some embodiments, sounds within the 1.5 kHz to 7 kHz band can provide distinctive head characteristic information, and thus sounds within the 1.5-7 kHz range can be selected for emission from the speaker in the first earbud 104*a*. In some examples, a sound, jingle, and/or music including sounds in the 1.5-7 kHz range can be played when earbuds are first paired with a device to provide user identification.

In various implementations, earbuds can include hearing aids, earphones, and other devices that are worn by a user with one or more speakers on and/or in the user's ear. Earbuds can be used with mobile device, laptops, and PCs for many different applications, including videoconferencing, music listening, and communications, as well as other uses.

Figure 2:
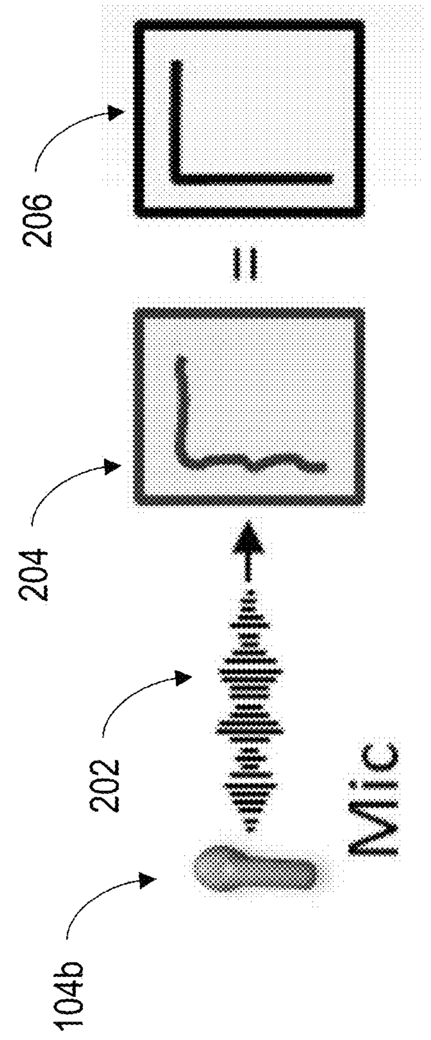
FIG. 2 is a simplified schematic illustrating a spectrum of the received filtered audio signal at the second earbud, in accordance with various embodiments.

FIG. 2 is a simplified schematic illustrating a spectrum 204 of the received filtered audio signal 202 at the second earbud 104*b*, in accordance with various embodiments. The received audio signal 202 is the sound emitted from the first earbud 104*a* and filtered by the user's head. The spectrum 204 of the received audio signal 202 is compared with a user profile to determine whether the received filtered audio signal 202 matches the user profile. In various embodiments, the user identification can be embedded in the earbuds' processor and can occur at the earbuds. In other embodiments, the processing of the received audio signal 202 to identify the user can be performed on a system connected to the earbuds, such as a mobile device, laptop, or PC. For instance, the received audio signal at the microphone can be transmitted to a user's mobile phone, where a dedicated application can determine the spectrogram and compare it to the user's stored spectral template. In other embodiments, the processing of the received audio signal 202 to identify the user can be performed in the cloud.

In some embodiments, the spectral analysis can be performed using a short time Fourier transform (STFT) on the received audio signal 202. Multiple spectra of the received audio signal 202 can be averaged into a Mean Power Spectrum ($\hat{P}(\omega)$) and compared with the stored spectrum of the target user. The Mean Power Spectrum can show how the received audio signal's power is distributed across different frequencies. In particular, the Mean Power Spectrum can show the average power present in the audio signal at each frequency. In some examples, once the time-domain audio signal is transformed to a frequency domain signal, the power at each frequency can be analyzed. The target user can be a registered user (and/or registered owner) of the earbuds. In some examples, the matching score algorithm can be log-spectral distance $D_{LS}$, which can be defined as:

$$D_{LS} = \sqrt{\frac{1}{2\pi}\int_{-\pi}^{\pi}\left[\log P(\omega) - \log\hat{P}(\omega)\right]^2 d\omega}$$

In other examples, other analyses can be used to determine whether the received filtered audio signal includes head characteristics matching the target user and to identify the user. In some examples, spectral variants such as Mel, MFCC (Mel-Frequency Cepstral Coefficients), and/or Spectral Delta can be used for spectral analysis and user identification.

In various examples, the user identification system with audio earbuds provides user identification verification as an additional step to connecting the audio earbuds, providing safeguards against others using someone's earbuds without their permission. The user identification system can also prevent another person from accessing audio on a user's device without the user's permission. In further embodiments, the user identification system with audio earbuds can be used for cross-device personalization. In particular, when the system verifies a user identity in the cloud, the verification can be used to suggest personalized settings in new devices or devices that are connected to a different device from the same user.

Figure 3:
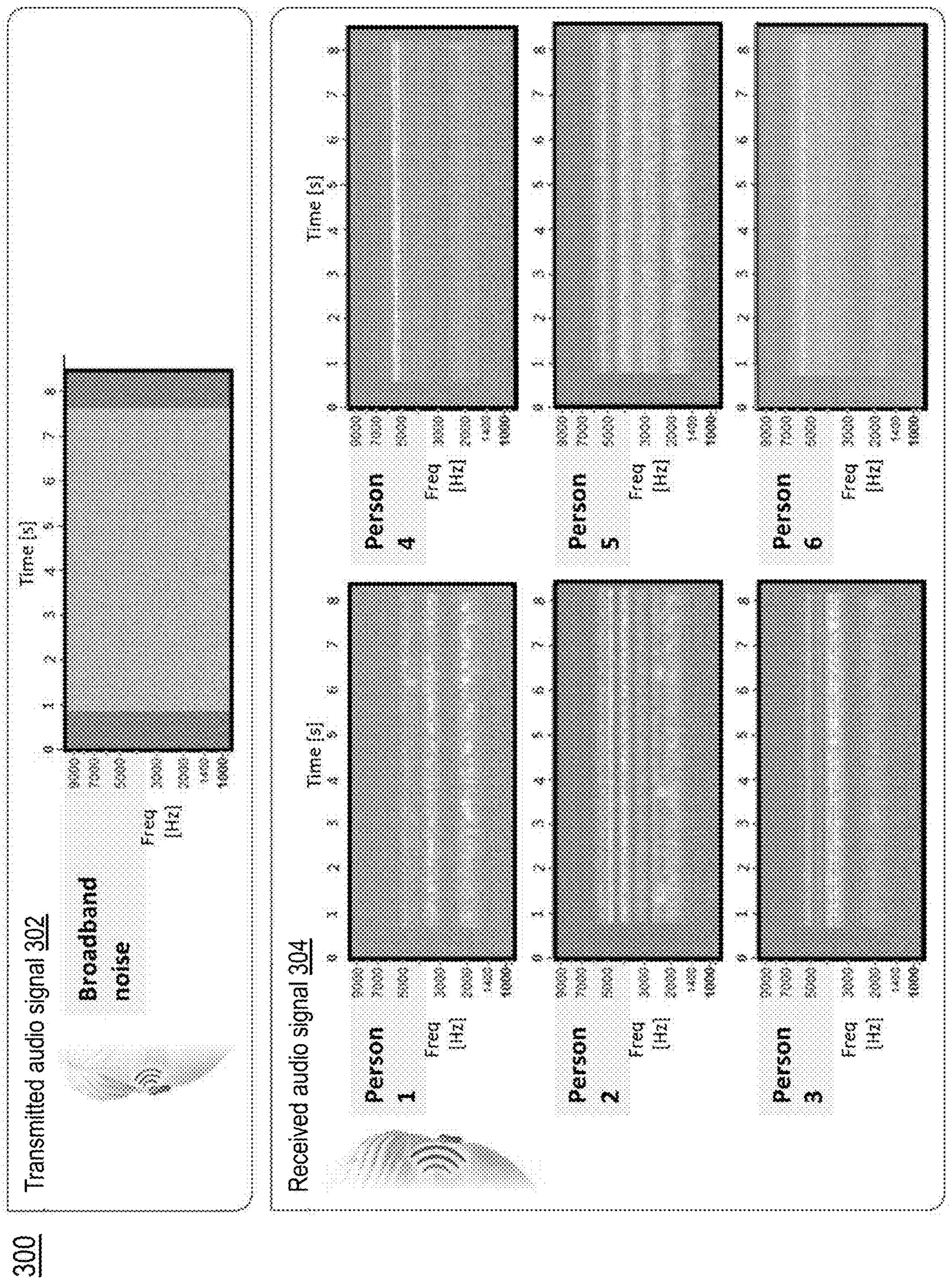
FIG. 3 illustrates spectrograms of a transmitted audio signal and of the received audio signal for six different users, in accordance with various embodiments.

FIG. 3 illustrates spectrograms of a transmitted audio signal and of the received audio signal for six different users, in accordance with various embodiments. The output audio signal in the example 300 of FIG. 3 is a broadband noise (e.g., a white noise). The broadband noise was emitted from a speaker in a first earbud to a first ear of each user, and the received audio signal at the second earbud in the second ear of each user was recorded. The spectrograms of the received audio signal 304 for each user, as filtered by each user's head, is shown in the bottom portion of FIG. 3. As can be seen in FIG. 3, the spectrogram of the received audio signal 304 is different for each user. Each spectrogram shown in FIG. 3 shows a response in the 1 kHz to 9 kHz range over a seven second recording. The characteristics of the spectrogram for each user are different, with different frequency bands highlighted for each user. Thus, for each user, different frequency bands have different amplitudes, and the average spectrum generated from each of the spectrograms on FIG. 3 is different and unique to each user.

Using the spectral information as illustrated in FIG. 3, each user can be differentiated and identified. In particular, a spectral template can be determined for the user of the earbuds (e.g., the owner or other registered earbuds user). In some examples, the spectral template for a user can be generated using spectra from a single audio transmission and corresponding received audio signal. In some examples, the spectral template for a user can be generated by averaging spectra from multiple audio transmissions and multiple corresponding received audio signals. Each time a set of earbuds initiates coupling and/or connection with a device, an audio signal can be transmitted from a speaker at the first earbud, and the spectrogram and/or spectra of the received audio signal at the microphone of the second earbud can be compared the stored spectral for the registered user(s) of the earbuds. When the spectrogram and/or spectra of the received audio signal match the stored spectral template, the user is identified. In some examples, when the user is identified, the earbuds are unlocked and paired to one or more devices. For example, the earbuds can be coupled to multiple devices registered to the same user. In some examples, when the user is identified, earbud personalization options can be suggested.

Figure 4:
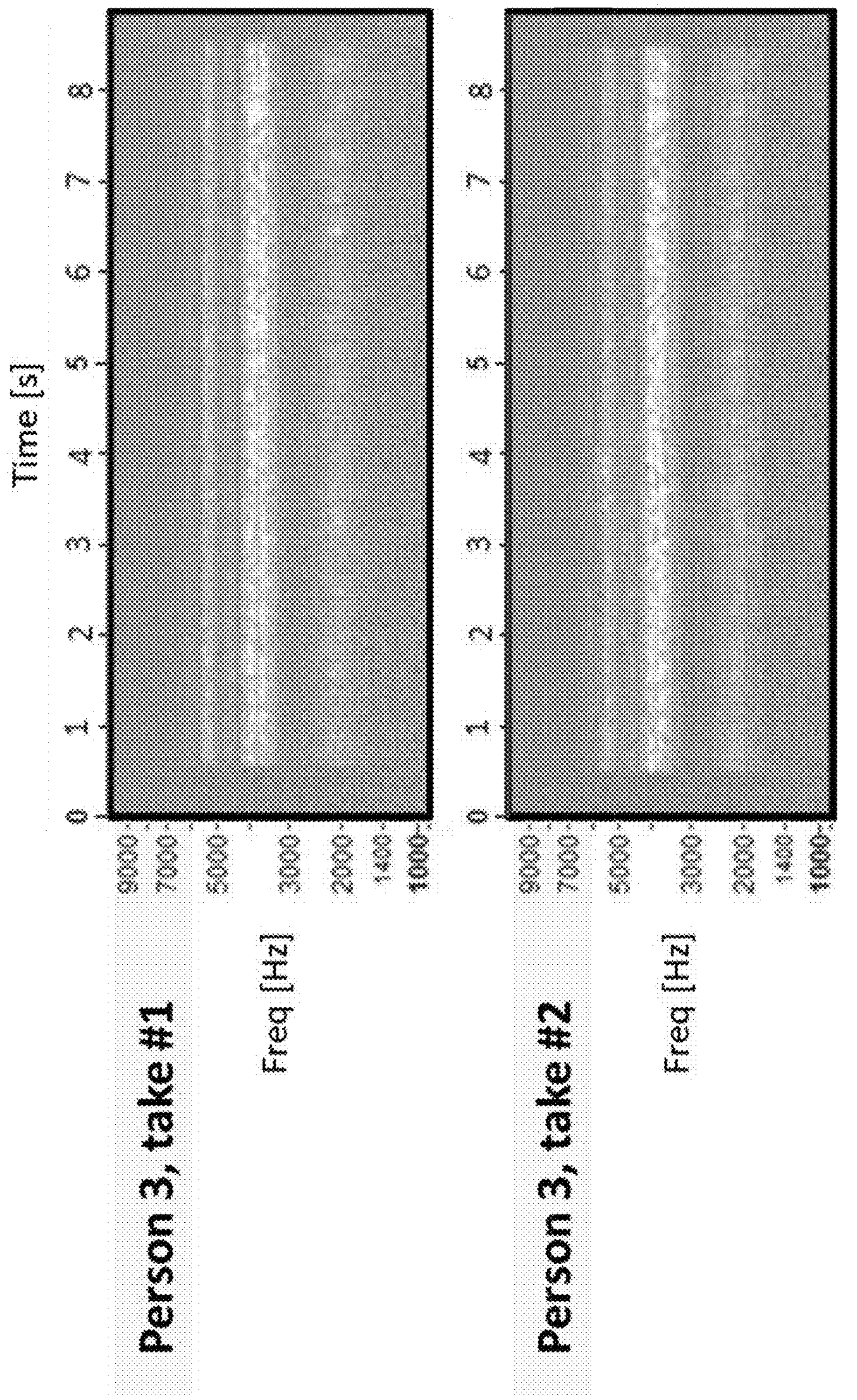
FIG. 4 illustrates spectrograms of the received audio signal for a selected user at two different times in accordance with various embodiments.

FIG. 4 illustrates spectrograms of the received audio signal for a selected user at two different times, in accordance with various embodiments. FIG. 4 shows that the spectral pattern obtained for a user is consistent over time, allowing for consistent user identification.

FIG. 5 is a table illustrating the log spectral distance comparison between two takes of recordings for six different users, in accordance with various embodiments. In some examples, spectral distance analysis determines the root-mean-squared value of the difference between two log spectrums. In FIG. 5, the average spectrum of the received audio signals recorded at the microphone in the second earbud during a first trial was compared with the average spectrum of the received audio signals recorded at the microphone in the second earbud during a second trial. As seen in FIG. 5, the spectral distance for the same user at two different trials is much lower than the spectral distance between different users. In particular, the average distance among different users is 30.72 dB, while the average spectral distance for the same user is 10.84 dB.

In some embodiments, a threshold spectral distance can be set, such that when the spectral distance between a received audio signal spectra and the user spectral template is below (or equal to) the threshold, pairing of the earbuds with the user device proceeds. Similarly, when the spectral distance between a received audio signal spectra and the user spectral template is above the threshold, pairing of the earbuds with the user device does not proceed. In some examples, a set of earbuds and/or a device configured for coupling to a set of earbuds can have multiple registered users, and the measured spectral distance can be compared to the threshold spectral distance for each registered user.

In various embodiments, when earbuds pair (and/or couple, and/or connect) with a device, there is a handshake process to authenticate the earbuds. In some examples, the handshake process is a Bluetooth LE (low energy) handshake process and in other examples, a different wireless pairing signal is used for the pairing. The spectral distance determination can be incorporated as part of the handshake process when pairing the earbuds. For example, the authentication determination as described herein can be used as an additional gate for the BT handshake process. In some examples, the authentication determination as described herein can be used as an additional verification of the user's identity in a cloud service.

In some implementations, once a user is identified, saved personalized device settings can be applied. For new devices, including both brand new devices and devices that have not previously been connected with the earbuds, personalized settings can be suggested, eliminating and/or minimizing device setup activities.

In some implementations, the earbuds can be hearing aids. Various types of hearing aids that can use the user identification systems and methods described herein include behind-the-ear hearing aids, receiver-in-the-ear-canal hearing aids, and in-the-ear hearing aids. In general, the earbuds described herein can be any type of speaker/microphone device that is worn by a user including on-the-ear earphones and over-the-ear earphones.

In some scenarios, earbuds may be used in noisy environments. The systems and methods described herein use audio captured with a microphone in open space, and thus the microphone may also capture noise and other interference from environmental sounds. However, earbuds are generally designed to include efficient noise reduction strategies to reduce, minimize, and/or remove environment noises. The received audio signal can be preprocessed to reduce environmental noises using noise reduction techniques already implemented for the earbuds, and the preprocessed received audio signal can be used to generate the audio signal spectrum of the received audio signal.

Example Method of User Identification Using Audio Earbuds.

Figure 6:
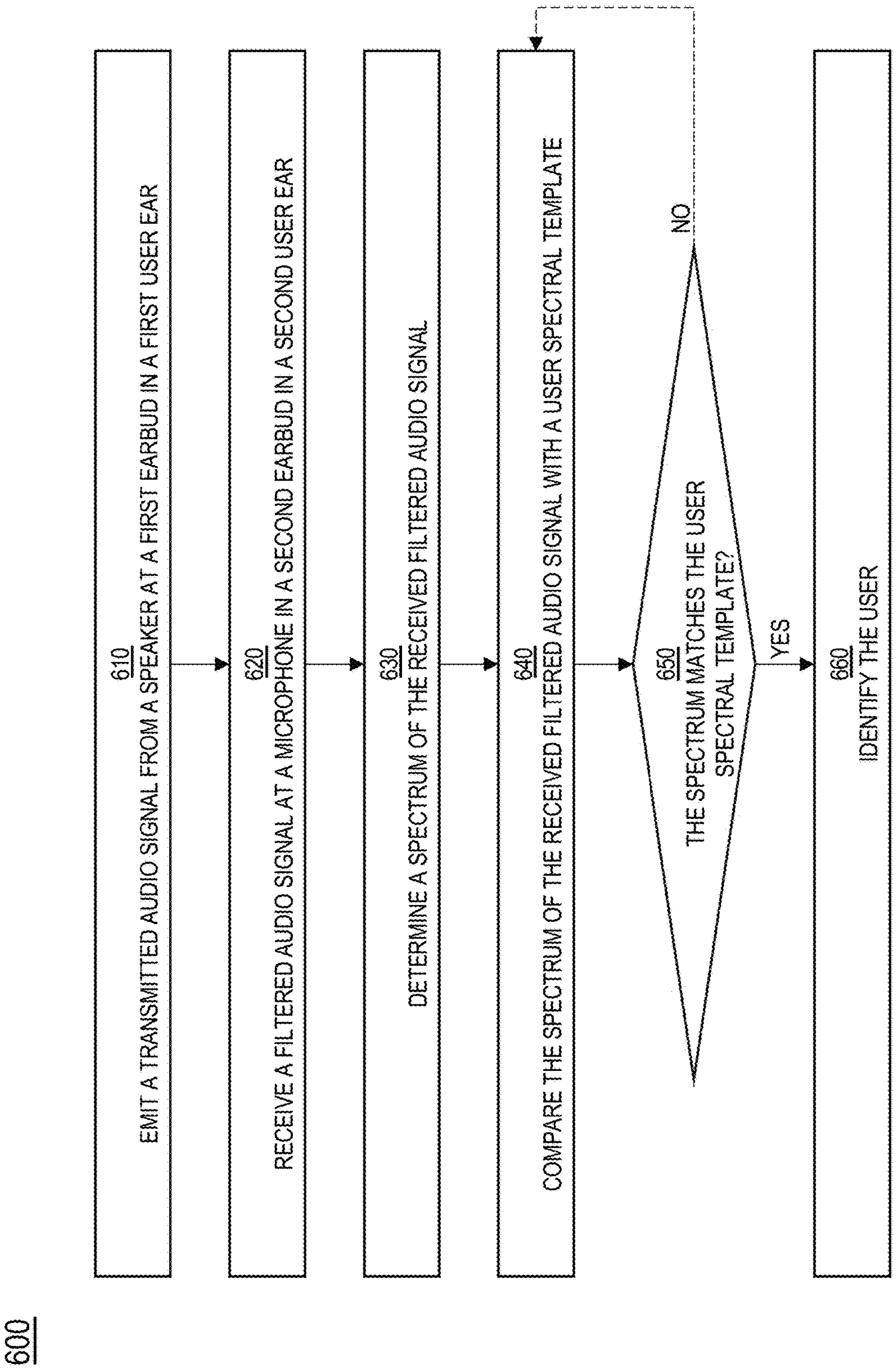
FIG. 6 is a flowchart showing a method 600 for user identification using audio earbuds, in accordance with various embodiments.

FIG. 6 is a flowchart showing a method 600 for user identification using audio earbuds, in accordance with various embodiments. The method 600 may be performed by the computing device 800 in FIG. 8. Although the method 600 is described with reference to the flowchart illustrated in FIG. 6, many other methods for TNR calibration may alternatively be used. For example, the order of execution of the steps in FIG. 6 may be changed. As another example, some of the steps may be changed, eliminated, or combined.

At step 610, an audio signal is emitted from a speaker at first earbud. The audio signal can be a white noise, a chirp, an MLS (maximum length sequence), a jingle, music, or another audio signal. A chirp can be a signal in which the frequency increases or decreases over time, and can cover a wide range of frequencies. MLS can be a pseudorandom binary sequence having properties similar to white noise. The audio signal is emitted when the first earbud is in a user's ear. In some examples, the audio signal is emitted a selected period of time after the first earbud is activated, and in some examples, the earbud includes one or more sensors indicating when it is likely in a user's ear.

At step 620, a filtered audio signal is received at a microphone in a second earbud. The filtered audio signal is the audio signal received at the second earbud as filtered by the user's head. That is, the received audio signal is filtered by the user's head and the head characterization of the received filtered sound can be used to identify the user. In particular, the material properties of the user's head (e.g., size, shape, rigidness, elasticity, density, etc.) change the signal, such that the received signal at the microphone of the second earbud is different from the transmitted signal. The differences are unique to the user's head due to physiological variances among people, and can be used to identify the user. In some examples, the head characterization occurs just from one selected side (i.e., ear) to the other side, and in some examples, head characterization can occur in both directions. An identification module can analyze the characteristics of the sound as received at the microphone of the second earbud to identify the user.

At step 630, a spectrum of the received filtered audio signal is determined. In some examples, multiple spectra of the received filtered audio signal are determined, with each of the multiple spectra centered at a different time point of the received filtered audio signal, and the multiple spectra are averaged to generate an average spectrum of the received filtered audio signal. In some examples, a mean power spectra is determined as described above.

At step 640, the spectrum of the received filtered audio signal is compared with a user spectral template. In some examples, the spectrum of the received filtered audio signal can be the average spectrum and/or the mean power spectra. The user spectral template can be a template spectrum saved for the user as the target spectrum for user identification.

At step 650, it is determined whether the spectrum of the received filtered audio signal matches the user spectral template. In some examples, a spectral distance is determined for the distance between the spectrum of the received filtered audio signal and the user spectral template. A spectrum of the received filtered audio signal can be determined to match a user spectral template if the spectral distance is below a selected threshold. If the spectral distance is equal to and/or above the selected threshold, it may be determined that the spectrum of the received filtered audio signal does not match a user spectral template. If there is a match at step 650, the method 600 proceeds to step 660, and the user is identified (as the use associated with the matching spectral template). If there is no match at step 650, the method 600 may end. Alternatively, in some embodiments, the method 600 may return to step 640 and compare the spectrum of the received filtered audio signal to a user spectral template for a different registered user of the earbuds.

In some embodiments, the spectral template for a user can be generated by emitting one or more audio signals from the first earbud, and averaging spectra from received filtered audio signals at the second earbud. In some examples, the spectral template for a user is generated using a deep learning system, such as the deep learning system 700 in FIG. 7.

Example Deep Learning System

Figure 7:
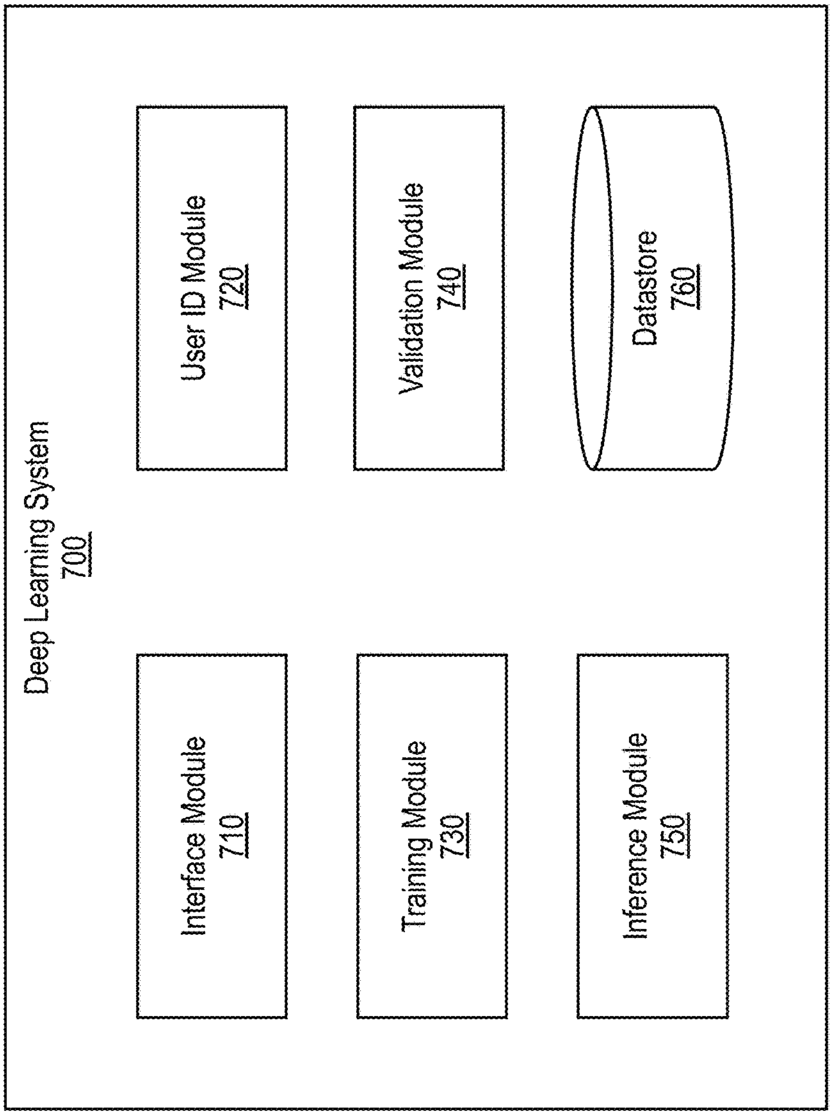
FIG. 7 is a block diagram of an example deep learning system, in accordance with various embodiments.

FIG. 7 is a block diagram of an example deep learning system 700, in accordance with various embodiments. The deep learning system 700 trains DNNs for various tasks, including audio-based user identification. In some examples, the deep learning system 700 can be used to generate a user identification spectrum, a user identification spectral template, and/or a user identification Mean Power Spectrum. The deep learning system 700 includes an interface module 710, an audio-based user identification module 720, a training module 730, a validation module 740, an inference module 750, and a datastore 760. In other embodiments, alternative configurations, different or additional components may be included in the deep learning system 700. Further, functionality attributed to a component of the deep learning system 700 may be accomplished by a different component included in the deep learning system 700 or a different system. The deep learning system 700 or a component of the deep learning system 700 (e.g., the training module 730 or inference module 750) may include the computing device 800 in FIG. 8.

The interface module 710 facilitates communications of the deep learning system 700 with other systems. As an example, the interface module 710 supports the deep learning system 700 to distribute trained DNNs to other systems and/or to distribute user identification templates to other systems, e.g., computing devices configured to apply DNNs to perform tasks. As another example, the interface module 710 establishes communications between the deep learning system 700 with an external database to receive data that can be used to train DNNs or input into DNNs to perform tasks. In some embodiments, data received by the interface module 710 may have a data structure, such as a matrix. In some embodiments, data received by the interface module 710 may be audio, such as an audio stream.

The user identification module 720 processes the received audio signal to identify spectral characteristics of the input data. In general, the user identification module 720 reviews the input data and determines whether the spectral characteristics of the input data match the user ID spectral template data. During training, the user identification module 720 is fed received audio data for the user, as filtered by the user's head as described above, including, for example, spectral data, and the user identification module 720 learns to identify the user.

The training module 730 trains DNNs by using training datasets. In some embodiments, a training dataset for training a DNN may include audio streams. In some examples, the training module 730 trains the user identification module 720. The training module 730 may receive received filtered audio data for processing with the user identification module 720 as described herein.

In some embodiments, a part of the training dataset may be used to initially train the user identification module 720, and the rest of the training dataset may be held back as a validation subset used by the validation module 740 to validate performance of a trained user identification module 720. The portion of the training dataset not including the tuning subset and the validation subset may be used to train the user identification module 720.

The training module 730 also determines hyperparameters for training the user identification module 720. Hyperparameters are variables specifying the user identification module 720 training process. Hyperparameters are different from parameters inside the user identification module 720 (e.g., weights of filters). In some embodiments, hyperparameters include variables determining the architecture of the user identification module 720, such as number of hidden layers, etc. Hyperparameters also include variables which determine how the user identification module is trained, such as batch size, number of epochs, etc. A batch size defines the number of training samples to work through before updating the parameters of the user identification module 720. The batch size is the same as or smaller than the number of samples in the training dataset. The training dataset can be divided into one or more batches. The number of epochs defines how many times the entire training dataset is passed through the entire network. The number of epochs defines the number of times that the deep learning algorithm works through the entire training dataset. One epoch means that each training sample in the training dataset has had an opportunity to update the parameters inside the user identification module. An epoch may include one or more batches. The number of epochs may be 1, 10, 50, 100, or even larger.

The training module 730 defines the architecture of the user identification module 720, e.g., based on some of the hyperparameters. The architecture of the user identification module 720 includes an input layer, an output layer, and a plurality of hidden layers. The input layer of a user identification module 720 may include tensors (e.g., a multidimensional array) specifying attributes of the input, such as weights and biases, attention scores, and/or activations. The output layer includes labels of objects in the input layer. The hidden layers are layers between the input layer and output layer. In various examples, the user identification module can be a transformer model, a recurrent neural network (RNN), and/or a deep neural network (DNN). When the user identification module includes a convolutional neural network (CNN), the hidden layers may include one or more convolutional layers and one or more other types of layers, such as pooling layers, fully connected layers, normalization layers, softmax or logistic layers, and so on. The convolutional layers of the DNN abstract the input to a feature map that is represented by a tensor specifying the features. A pooling layer is used to reduce the spatial volume of input after convolution. It is used between 2 convolution layers. A fully connected layer involves weights, biases, and neurons. It connects neurons in one layer to neurons in another layer. It is used to classify input between different categories by training.

In the process of defining the architecture of the DNN, the training module 730 also adds an activation function to a hidden layer or the output layer. An activation function of a layer transforms the weighted sum of the input of the layer to an output of the layer. The activation function may be, for example, a rectified linear unit activation function, a tangent activation function, or other types of activation functions.

After the training module 730 defines the architecture of the user identification module 720, the training module 730 inputs a training dataset into the user identification module 720. The training dataset includes a plurality of training samples. An example of a training dataset includes a spectrogram of an audio stream.

The training module 730 may train the user identification module 720 for a predetermined number of epochs. The number of epochs is a hyperparameter that defines the number of times that the deep learning algorithm will work through the entire training dataset. One epoch means that each sample in the training dataset has had an opportunity to update internal parameters of the DNN. After the training module 730 finishes the predetermined number of epochs, the training module 730 may stop updating the parameters in the DNN. The DNN having the updated parameters is referred to as a trained DNN.

The validation module 740 verifies accuracy of trained DNNs. In some embodiments, the validation module 740 inputs samples in a validation dataset into a trained DNN and uses the outputs of the DNN to determine the model accuracy. In some embodiments, a validation dataset may be formed of some or all the samples in the training dataset. Additionally or alternatively, the validation dataset includes additional samples, other than those in the training sets. In some embodiments, the validation module 740 may determine an accuracy score measuring the precision, recall, or a combination of precision and recall of the user identification module. The validation module 740 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 740 may compare the accuracy score with a threshold score. In an example where the validation module 740 determines that the accuracy score of the augmented model is lower than the threshold score, the validation module 740 instructs the training module 730 to re-train the user identification module. In one embodiment, the training module 730 may iteratively re-train the user identification module until the occurrence of a stopping condition, such as the accuracy measurement indication that the user identification module may be sufficiently accurate, or a number of training rounds having taken place.

The inference module 750 applies the trained or validated user identification module to perform tasks. The inference module 750 may run inference processes of a trained or validated user identification module 720. In some examples, inference makes use of the forward pass to produce model-generated output for unlabeled real-world data. For instance, the inference module 750 may input real-world data into the user identification module 720 and receive an output of the user identification module 720. The output of the user identification module 720 may provide a solution to the task for which the user identification module is trained for.

The inference module 750 may aggregate the outputs of the user identification module to generate a final result of the inference process. In some embodiments, the inference module 750 may distribute the user identification module to other systems, e.g., computing devices in communication with the deep learning system 700, for the other systems to apply the user identification module to perform the tasks. The distribution of the user identification module 720 may be done through the interface module 710. In some embodiments, the deep learning system 700 may be implemented in a server, such as a cloud server, an edge service, and so on. The computing devices may be connected to the deep learning system 700 through a network. Examples of the computing devices include edge devices.

The datastore 760 stores data received, generated, used, or otherwise associated with the deep learning system 700. For example, the datastore 760 stores video processed by the user identification module 720 or used by the training module 730, validation module 740, and the inference module 750. The datastore 760 may also store other data generated by the training module 730 and validation module 740, such as the hyperparameters for training user identification modules, internal parameters of trained user identification modules (e.g., values of tunable parameters of activation functions, such as Fractional Adaptive Linear Units (FALUs)), etc. In the embodiment of FIG. 7, the datastore 760 is a component of the deep learning system 700. In other embodiments, the datastore 760 may be external to the deep learning system 700 and communicate with the deep learning system 700 through a network.

Example Computing Device

Figure 8:
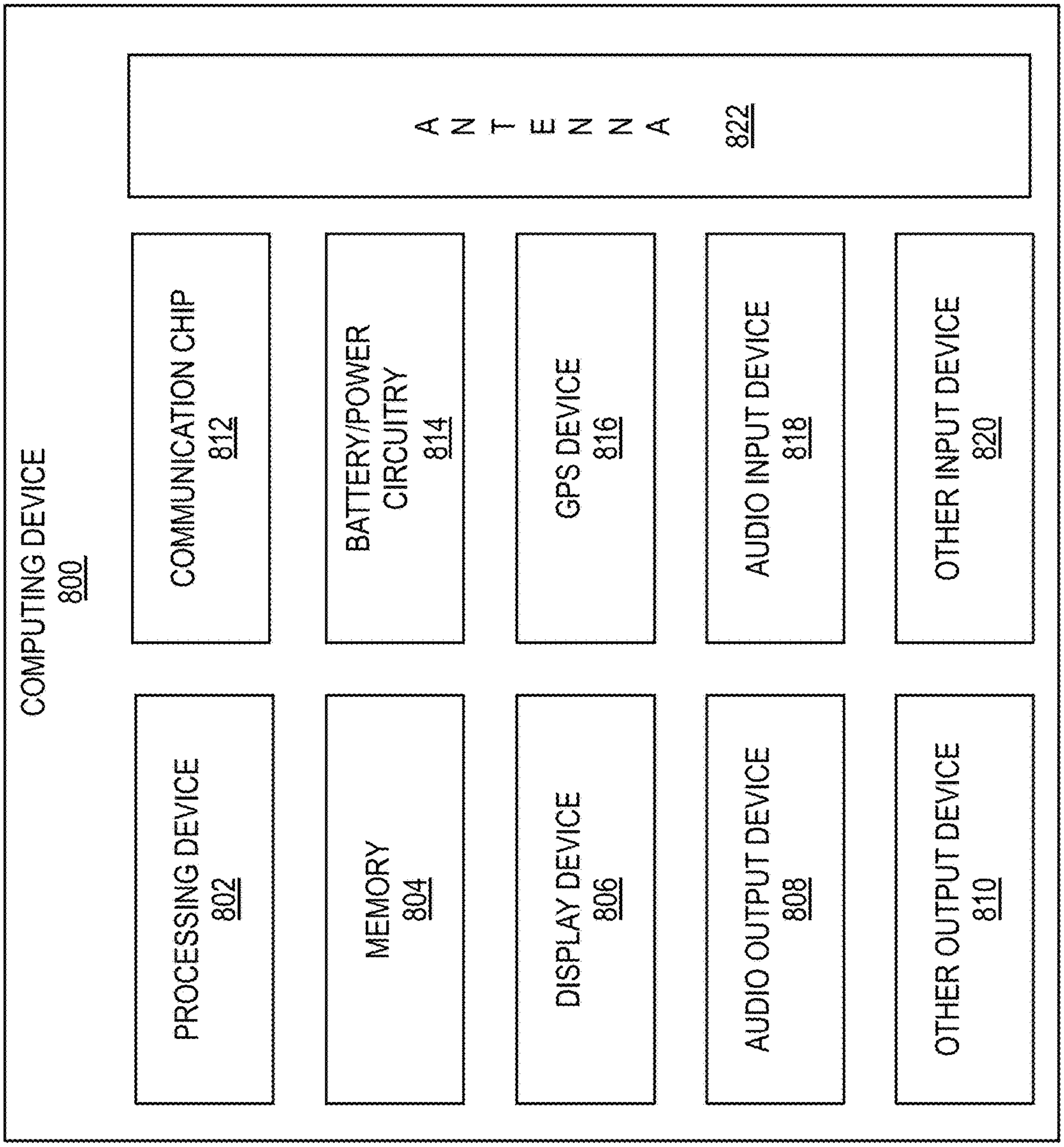
FIG. 8 is a block diagram of an example computing device, in accordance with various embodiments.

FIG. 8 is a block diagram of an example computing device 800, in accordance with various embodiments. In some embodiments, the computing device 800 may be used for at least part of the systems in FIGS. 1-7. A number of components are illustrated in FIG. 8 as included in the computing device 800, but any one or more of these components may be omitted or duplicated, as suitable for the application. In some embodiments, some or all of the components included in the computing device 800 may be attached to one or more motherboards. In some embodiments, some or all of these components are fabricated onto a single system on a chip (SoC) die. Additionally, in various embodiments, the computing device 800 may not include one or more of the components illustrated in FIG. 8, but the computing device 800 may include interface circuitry for coupling to the one or more components. For example, the computing device 800 may not include a display device 806, but may include display device interface circuitry (e.g., a connector and driver circuitry) to which a display device 806 may be coupled. In another set of examples, the computing device 800 may not include a video input device 818 or a video output device 808, but may include video input or output device interface circuitry (e.g., connectors and supporting circuitry) to which a video input device 818 or video output device 808 may be coupled.

The computing device 800 may include a processing device 802 (e.g., one or more processing devices). The processing device 802 processes electronic data from registers and/or memory to transform that electronic data into other electronic data that may be stored in registers and/or memory. The computing device 800 may include a memory 804, which may itself include one or more memory devices such as volatile memory (e.g., DRAM), nonvolatile memory (e.g., read-only memory (ROM)), high bandwidth memory (HBM), flash memory, solid state memory, and/or a hard drive. In some embodiments, the memory 804 may include memory that shares a die with the processing device 802. In some embodiments, the memory 804 includes one or more non-transitory computer-readable media storing instructions executable for occupancy mapping or collision detection, e.g., the method described above in conjunction with FIGS. 4A-4B or some operations performed by the DNN system 700 in FIG. 7. The instructions stored in the one or more non-transitory computer-readable media may be executed by the processing device 802.

In some embodiments, the computing device 800 may include a communication chip 812 (e.g., one or more communication chips). For example, the communication chip 812 may be configured for managing wireless communications for the transfer of data to and from the computing device 800. The term "wireless" and its derivatives may be used to describe circuits, devices, systems, methods, techniques, communications channels, etc., that may communicate data using modulated electromagnetic radiation through a nonsolid medium. The term does not imply that the associated devices do not contain any wires, although in some embodiments they might not.

The communication chip 812 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication chip 812 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 512 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 512 may operate in accordance with code-division multiple access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 512 may operate in accordance with other wireless protocols in other embodiments. The computing device 800 may include an antenna 822 to facilitate wireless communications and/or to receive other wireless communications (such as AM or FM radio transmissions).

In some embodiments, the communication chip 812 may manage wired communications, such as electrical, optical, or any other suitable communication protocols (e.g., the Ethernet). As noted above, the communication chip 812 may include multiple communication chips. For instance, a first communication chip 812 may be dedicated to shorter-range wireless communications such as Wi-Fi or Bluetooth, and a second communication chip 812 may be dedicated to longer-range wireless communications such as global positioning system (GPS), EDGE, GPRS, CDMA, WiMAX, LTE, EV-DO, or others. In some embodiments, a first communication chip 812 may be dedicated to wireless communications, and a second communication chip 812 may be dedicated to wired communications.

The computing device 800 may include battery/power circuitry 814. The battery/power circuitry 814 may include one or more energy storage devices (e.g., batteries or capacitors) and/or circuitry for coupling components of the computing device 800 to an energy source separate from the computing device 800 (e.g., AC line power).

The computing device 800 may include a display device 806 (or corresponding interface circuitry, as discussed above). The display device 806 may include any visual indicators, such as a heads-up display, a computer monitor, a projector, a touchscreen display, a liquid crystal display (LCD), a light-emitting diode display, or a flat panel display, for example.

The computing device 800 may include a video output device 808 (or corresponding interface circuitry, as discussed above). The video output device 808 may include any device that generates an audible indicator, such as speakers, headsets, or earbuds, for example.

The computing device 800 may include a video input device 818 (or corresponding interface circuitry, as discussed above). The video input device 818 may include any device that generates a signal representative of a sound, such as microphones, microphone arrays, or digital instruments (e.g., instruments having a musical instrument digital interface (MIDI) output).

The computing device 800 may include a GPS device 816 (or corresponding interface circuitry, as discussed above). The GPS device 816 may be in communication with a satellite-based system and may receive a location of the computing device 800, as known in the art.

The computing device 800 may include another output device 810 (or corresponding interface circuitry, as discussed above). Examples of the other output device 810 may include a video codec, a video codec, a printer, a wired or wireless transmitter for providing information to other devices, or an additional storage device.

The computing device 800 may include another input device 820 (or corresponding interface circuitry, as discussed above). Examples of the other input device 820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 800 may have any desired form factor, such as a handheld or mobile computer system (e.g., a cell phone, a smart phone, a mobile internet device, a music player, a tablet computer, a laptop computer, a netbook computer, an ultrabook computer, a personal digital assistant (PDA), an ultramobile personal computer, etc.), a desktop computer system, a server or other networked computing component, a printer, a scanner, a monitor, a set-top box, an entertainment control unit, a vehicle control unit, a digital camera, a digital video recorder, or a wearable computer system. In some embodiments, the computing device 800 may be any other electronic device that processes data.

Select Examples

Example 1 provides a computer-implemented method for user identification, including emitting a transmitted audio signal from a speaker at a first earbud; receiving a filtered audio signal at a microphone in a second earbud, where the filtered audio signal is filtered by a user head; determining an audio signal spectrum of the filtered audio signal; comparing the audio signal spectrum with a user spectral template; determining the audio signal spectrum is a match for the user spectral template; and identifying the user.

Example 2 provides the computer-implemented method of example 1, where determining the audio signal spectrum includes averaging a plurality of spectra of the filtered audio signal, each of the plurality of spectra centered at a different time point.

Example 3 provides the computer-implemented method of example 2, where determining the audio signal spectrum includes determining a mean power spectrum.

Example 4 provides the computer-implemented method of example 1, where the first earbud and the second earbud are hearing aids.

Example 5 provides the computer-implemented method of example 1, where determining the audio signal spectrum is a match for the user spectral template includes determining a log spectral distance between the audio signal spectrum and the user spectral template.

Example 6 provides the computer-implemented method of example 5, further including determining the log spectral distance is less than a threshold.

Example 7 provides the computer-implemented method of example 1, where the user spectral template is a second user spectral template, and further including comparing the audio signal spectrum with a first user spectral template and determining the audio signal spectrum is different from the first user spectral template.

Example 8 provides one or more non-transitory computer-readable media storing instructions executable to perform operations, the operations including emitting a transmitted audio signal from a speaker at a first earbud; receiving a filtered audio signal at a microphone in a second earbud, where the filtered audio signal is filtered by a user head; determining an audio signal spectrum of the filtered audio signal; comparing the audio signal spectrum with a user spectral template; determining the audio signal spectrum is a match for the user spectral template; and identifying the user.

Example 9 provides the one or more non-transitory computer-readable media of example 8, where determining the audio signal spectrum includes averaging a plurality of spectra of the filtered audio signal, each of the plurality of spectra centered at a different time point.

Example 10 provides the one or more non-transitory computer-readable media of example 9, where determining the audio signal spectrum includes determining a mean power spectrum.

Example 11 provides the one or more non-transitory computer-readable media of example 8, where the first earbud and the second earbud are hearing aids.

Example 12 provides the one or more non-transitory computer-readable media of example 8, where determining the audio signal spectrum is a match for the user spectral template includes determining a log spectral distance between the audio signal spectrum and the user spectral template.

Example 13 provides the one or more non-transitory computer-readable media of example 12, where the operations further include determining the log spectral distance is less than a threshold.

Example 14 provides the one or more non-transitory computer-readable media of example 8, where the user spectral template is a second user spectral template, and where the operations further include comparing the audio signal spectrum with a first user spectral template and determining the audio signal spectrum is different from the first user spectral template.

Example 15 provides an apparatus, including a computer processor for executing computer program instructions; and a non-transitory computer-readable memory storing computer program instructions executable by the computer processor to perform operations including emitting a transmitted audio signal from a speaker at a first earbud; receiving a filtered audio signal at a microphone in a second earbud, where the filtered audio signal is filtered by a user head; determining an audio signal spectrum of the filtered audio signal; comparing the audio signal spectrum to a user spectral template; determining the audio signal spectrum is a match for the user spectral template; and identifying the user.

Example 16 provides the apparatus of example 15, where determining the audio signal spectrum includes averaging a plurality of spectra of the filtered audio signal, each of the plurality of spectra centered at a different time point.

Example 17 provides the apparatus of example 16, where determining the audio signal spectrum includes determining a mean power spectrum.

Example 18 provides the apparatus of example 15, where the first earbud and the second earbud are hearing aids.

Example 19 provides the apparatus of example 15, where determining the audio signal spectrum is a match for the user spectral template includes determining a log spectral distance between the audio signal spectrum and the user spectral template.

Example 20 provides the apparatus of example 19, where the operations further include determining the log spectral distance is less than a threshold.

Example 21 provides the computer-implemented method and/or one or more non-transitory computer-readable media and/or apparatus of any of examples 1-20, wherein the earbuds are earphones.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A computer-implemented method for user identification, comprising:

emitting a transmitted audio signal from a speaker at a first earbud;

receiving a filtered audio signal at a microphone in a second earbud, wherein the filtered audio signal is filtered by a user head;

determining an audio signal spectrum of the filtered audio signal;

comparing the audio signal spectrum to a user spectral template;

determining the audio signal spectrum is a match for the user spectral template; and identifying the user.

2. The computer-implemented method of claim 1, wherein determining the audio signal spectrum includes averaging a plurality of spectra of the filtered audio signal, each of the plurality of spectra centered at a different time point.

3. The computer-implemented method of claim 2, wherein determining the audio signal spectrum includes determining a mean power spectrum.

4. The computer-implemented method of claim 1, wherein the first earbud and the second earbud are hearing aids.

5. The computer-implemented method of claim 1, wherein determining the audio signal spectrum is a match for the user spectral template includes determining a log spectral distance between the audio signal spectrum and the user spectral template.

6. The computer-implemented method of claim 5, further comprising determining the log spectral distance is less than a threshold.

7. The computer-implemented method of claim 1, wherein the user spectral template is a second user spectral template, and further comprising comparing the audio signal spectrum with a first user spectral template and determining the audio signal spectrum is different from the first user spectral template.

8. One or more non-transitory computer-readable media storing instructions executable to perform operations, the operations comprising:

emitting a transmitted audio signal from a speaker at a first earbud;

receiving a filtered audio signal at a microphone in a second earbud, wherein the filtered audio signal is filtered by a user head;

determining an audio signal spectrum of the filtered audio signal;

comparing the audio signal spectrum with a user spectral template;

determining the audio signal spectrum is a match for the user spectral template; and identifying the user.

9. The one or more non-transitory computer-readable media of claim 8, wherein determining the audio signal spectrum includes averaging a plurality of spectra of the filtered audio signal, each of the plurality of spectra centered at a different time point.

10. The one or more non-transitory computer-readable media of claim 9, wherein determining the audio signal spectrum includes determining a mean power spectrum.

11. The one or more non-transitory computer-readable media of claim 8, wherein the first earbud and the second earbud are hearing aids.

12. The one or more non-transitory computer-readable media of claim 8, wherein determining the audio signal spectrum is a match for the user spectral template includes determining a log spectral distance between the audio signal spectrum and the user spectral template.

13. The one or more non-transitory computer-readable media of claim 12, wherein the operations further comprise determining the log spectral distance is less than a threshold.

14. The one or more non-transitory computer-readable media of claim 8, wherein the user spectral template is a second user spectral template, and wherein the operations further comprise comparing the audio signal spectrum with a first user spectral template and determining the audio signal spectrum is different from the first user spectral template.

15. An apparatus, comprising:

a computer processor for executing computer program instructions; and a non-transitory computer-readable memory storing computer program instructions executable by the computer processor to perform operations comprising:

emitting a transmitted audio signal from a speaker at a first earbud;

receiving a filtered audio signal at a microphone in a second earbud, wherein the filtered audio signal is filtered by a user head;

determining an audio signal spectrum of the filtered audio signal;

comparing the audio signal spectrum with a user spectral template;

determining the audio signal spectrum is a match for the user spectral template; and identifying the user.

16. The apparatus of claim 15, wherein determining the audio signal spectrum includes averaging a plurality of spectra of the filtered audio signal, each of the plurality of spectra centered at a different time point.

17. The apparatus of claim 16, wherein determining the audio signal spectrum includes determining a mean power spectrum.

18. The apparatus of claim 15, wherein the first earbud and the second earbud are hearing aids.

19. The apparatus of claim 15, wherein determining the audio signal spectrum is a match for the user spectral template includes determining a log spectral distance between the audio signal spectrum and the user spectral template.

20. The apparatus of claim 19, wherein the operations further comprise determining the log spectral distance is less than a threshold.

* * * * *